(12) United States Patent
Sanchez

(10) Patent No.: US 11,953,319 B2
(45) Date of Patent: Apr. 9, 2024

(54) SLIDING ADJUSTABLE COMPASS HAVING A SUPPORT

(71) Applicant: Macario A. Sanchez, Rochester, MN (US)

(72) Inventor: Macario A. Sanchez, Rochester, MN (US)

(73) Assignee: Macario a. Sanchez, Pembroke Pines, FL (US)

( * ) Notice: Subject to any disclaimer, the term of this patent is extended or adjusted under 35 U.S.C. 154(b) by 180 days.

(21) Appl. No.: 17/155,996

(22) Filed: Jan. 22, 2021

(65) Prior Publication Data
US 2022/0236044 A1 Jul. 28, 2022

(51) Int. Cl.
*G01B 3/16* (2006.01)
*B26B 11/00* (2006.01)
*B43L 9/04* (2006.01)
*B26B 5/00* (2006.01)

(52) U.S. Cl.
CPC .............. *G01B 3/166* (2013.01); *B26B 11/00* (2013.01); *B43L 9/04* (2013.01); *B26B 5/00* (2013.01)

(58) Field of Classification Search
CPC .......... G01B 3/166; B26B 11/00; B26B 5/00; B43L 9/04
See application file for complete search history.

(56) References Cited

U.S. PATENT DOCUMENTS

| | | | | |
|---|---|---|---|---|
| 3,292,262 A | * | 12/1966 | Moll | B43L 9/04 33/27.03 |
| 3,524,258 A | * | 8/1970 | Novak | B43L 9/04 33/27.03 |
| 4,051,599 A | * | 10/1977 | Sinkovec | B43L 9/04 33/27.03 |
| 4,976,037 A | * | 12/1990 | Hines | B43L 9/045 33/759 |
| 5,253,421 A | * | 10/1993 | Landmark | B43L 9/04 33/760 |
| 6,298,562 B1 | * | 10/2001 | Duquette | B26B 11/00 30/162 |
| 6,546,634 B2 | * | 4/2003 | Ming | B43L 9/04 33/783 |
| 6,889,440 B2 | * | 5/2005 | Okada | B43L 9/16 33/18.1 |
| 6,907,669 B1 | * | 6/2005 | Han | B43K 29/001 33/27.03 |
| 6,983,545 B2 | * | 1/2006 | Okada | B43L 9/16 33/18.1 |
| 7,080,459 B1 | * | 7/2006 | Khan | B43L 13/002 33/30.5 |
| 7,383,635 B1 | * | 6/2008 | Stoneberg | B43L 7/005 33/27.03 |
| 7,823,294 B2 | * | 11/2010 | Contreras | B43L 9/007 33/27.03 |
| 8,407,909 B2 | * | 4/2013 | Lindsay | G01B 3/1061 33/760 |
| 9,618,313 B1 | * | 4/2017 | Johnson | G01B 3/08 |

(Continued)

*Primary Examiner* — Yaritza Guadalupe-McCall

(57) ABSTRACT

The present disclosure provides a sliding adjustable compass having a support for holding a variety of marking and cutting implements which can be easily replaced when they are used up. The construction of the compass is such that large diameter circles can be marked or cut precisely with the help of a viewing lens, whilst maintaining portability by a modular design.

8 Claims, 7 Drawing Sheets

(56) References Cited

U.S. PATENT DOCUMENTS

| | | | |
|---|---|---|---|
| 10,001,370 B2* | 6/2018 | Foster | G01C 1/00 |
| 2002/0083601 A1* | 7/2002 | Ming | B43L 9/04 33/27.03 |
| 2003/0056378 A1* | 3/2003 | Okada | B43L 9/04 33/27.031 |
| 2003/0182811 A1* | 10/2003 | Hairapetian | B43L 9/04 33/27.032 |
| 2006/0207114 A1* | 9/2006 | Stoner | B43L 9/245 33/27.03 |
| 2022/0236044 A1* | 7/2022 | Sanchez | B43L 9/04 |

* cited by examiner (C)

(B)

(A)

SLIDING ADJUSTABLE COMPASS HAVING A SUPPORT

The present invention relates generally to the field of cutting and marking tools. More specifically, the present invention relates to a sliding adjustable compass having a support for holding various cutting and marking implements.

BACKGROUND

There are a wide range of fields in which marking and cutting perfect circles or part-circumferences of circles is useful and sometimes necessary very frequently. One such field is the construction of buildings using drywall where circular holes of varying diameter are required on a recurring basis, from small holes for false ceilings to large holes of more than thirty inches in diameter such as air conditioned ducts.

Compasses are well-known as useful for facilitating the marking or cutting of circular shapes, however compasses presently available on the market have a number of deficiencies which render them inconvenient for repeated use in construction, with multiple different types of compasses often required to meet a user's needs.

One such issue is that many compasses for cutting purposes, for example drywall circle cutter compasses, have fixed blades that are not replaceable, leading to the blade quickly becoming dull and the purchase of a new compass becoming necessary. Users often resort instead to marking the circle with a carpenter's pencil and using a generic cutting tool such as a rotor-zip, sawzall, key hole saw, utility knife, or hole saw.

Compasses are also rarely larger than eight inches in maximum length, meaning that a user can only mark or cut sixteen inch circles. Manufacturers are reluctant to create larger compasses because these would become cumbersome to carry.

It is within this context that the present invention is provided.

SUMMARY

The present disclosure provides a sliding adjustable compass having a support for holding a variety of marking and cutting implements which can be easily replaced when they are used up. The construction of the compass is such that large diameter circles can be marked or cut precisely with the help of a viewing lens, whilst maintaining portability by a modular design.

Thus, according to the present disclosure there is provided an adjustable compass, comprising: a support having an aperture configured to receive and hold a marking or cutting implement; an elongate measuring element having a first end connected to the support, a length, and at least one set of markings along the length, each marking being indicative of a distance along the length from the support; and a central body having a tip element, an aperture configured to slidably receive the measuring element, and a viewing lens aligned with the aperture such that a marking of the measuring element is viewable through the lens when the measuring element is in place in the aperture, the marking thus indicating a distance between the central body and the support. The viewing lens may comprise a magnifying lens to increase the size of the visible marking when viewed through the lens.

The tip element may comprise an indented portion, and the adjustable compass further comprises a detachable suction cup element configured to be affixed to the indented portion of the tip element.

The measuring element may be in the form of an elongated cylinder having a flat indent along its circumference to prevent rotation within the aperture.

In some embodiments, the measuring element has two parallel sets of measurement markings on opposing sides of its length. A first set of markings may be in centimetres and a second set of markings may be in inches.

The central body may further comprise a tightening element for affixing the measuring element in place within the central body at a desired distance.

In some embodiments, the compass further includes one or more marking or cutting implements shaped to be received by the support.

In some embodiments, the support further comprises a tightening element for receiving cutting or marking implements of different sizes.

BRIEF DESCRIPTION OF THE DRAWINGS

Various embodiments of the invention are disclosed in the following detailed description and accompanying drawings.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
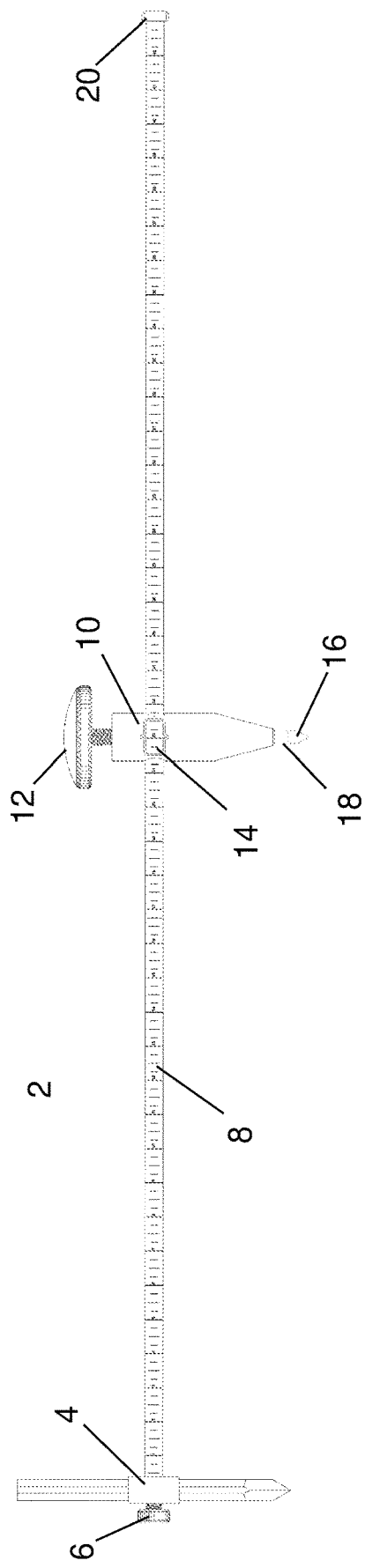
FIG. 1 illustrates an example configuration of an assembled sliding adjustable compass according to the present disclosure viewed from the side with a marking implement held in the support.

Referring to FIG. 1, an example configuration of an assembled sliding adjustable compass 2 is shown from the side with a marking implement held in the support 4.

In the present example the support 4 is shown having an aperture of adjustable width that can be narrowed or widened using a screw element (or knob) 6 in order to firmly hold a marking or cutting implement of choice. Implements that may be held by the support include for example square carpenter's pencils and other well known carpenters tools capable of cutting, scratching or marking surfaces such as paper, glass, and drywall.

The support is attached to a first end of an elongated measuring element 8. The measuring element 8 extends perpendicularly away from the direction which an implement held in the support 4 points, and has at least one set of markings/nomenclature along its length indicative of a distance from the first end attached to the support 4.

As can be seen, the maximum length to which the compass can extend is very long in comparison to the marking implement. While a compass of such length would usually be inconvenient to carry, the compass of the present disclosure can be formed of multiple modular parts to enable portability. For example, the measuring element 8 may come in several parts that screw onto each other to create the full length measuring element.

The measuring element 8 when assembled may be in the form of an elongated cylinder having a flat indent along its circumference to prevent rotation within the aperture.

The compass further comprises a central body 10 having an aperture configured to slidably receive the measuring element 8, such that the distance between the central body 10 and the support holding the implement is adjustable according to a user's desires by simply sliding the central body to a desired point. The central body 10 further comprises a tightening knob 12 that can clamp down on the measuring element 8 that has been threaded through the aperture in order to affix the central body a desired distance away from the support 4.

In order to enable easy and accurate reading of the distance between the central body and the support, a viewing lens 14 is provided in the central body and aligned in height with the aperture such that the relevant marking is visible with adjacent markings being blocked from view by the opaque material of the central body. The viewing lens can include or be a magnifying lens in order to enlarge the relevant marking when viewed through the lens.

The central body further comprises a tip portion 16 extending perpendicularly to the length of the measuring element and which a user places on the point of the surface they wish to mark/cut that is to be the centre point of the circle or arc they intend to mark/cut. The tip portion 16 is shaped so as to taper at the end, however there is also an indent 18 near the end portion of the tip that allows for attachments to be affixed to the tip, such as suction cup attachments for marking/cutting on flat surfaces.

The end of the measuring element that opposes the first end connected to the support 4 has in the present example a screw attachment 20 with a diameter greater than that of the aperture of the central body so as to prevent the central body from being able to slide off. The screw attachment also enables for easy dismantling or assembling of the compass form its modular form. Once the screw attachment 20 is unscrewed, the central body can be slid off the measuring element which can then be broken down into its modular components and stored away for easy transport.

The elements of the adjustable compass can be manufactured from any suitable kind of materials, including steel, stainless steel, aluminum, carbon fiber or any combination thereof.

Figure 2:
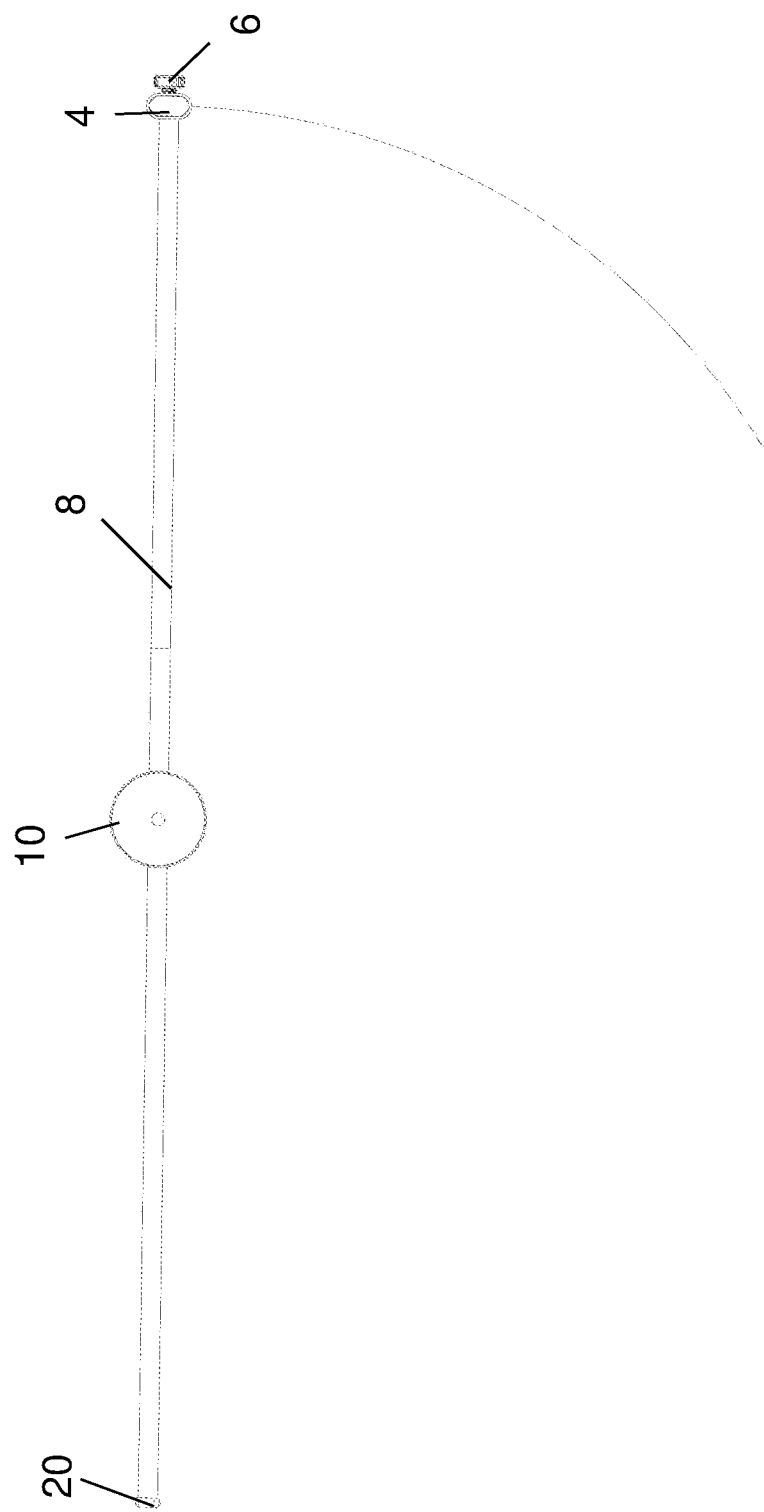
FIG. 2 illustrates an example configuration of an assembled sliding adjustable compass according to the present disclosure viewed from the top with a marking implement held in the support and in the process of marking an arc.

Referring to FIG. 2, the assembled sliding adjustable compass is shown from the top in the process of marking an arc using a marking implement held in the support 4. The arc is being marked from a centre point that is approximately half the maximum distance along the measuring element from the support.

Figure 3:
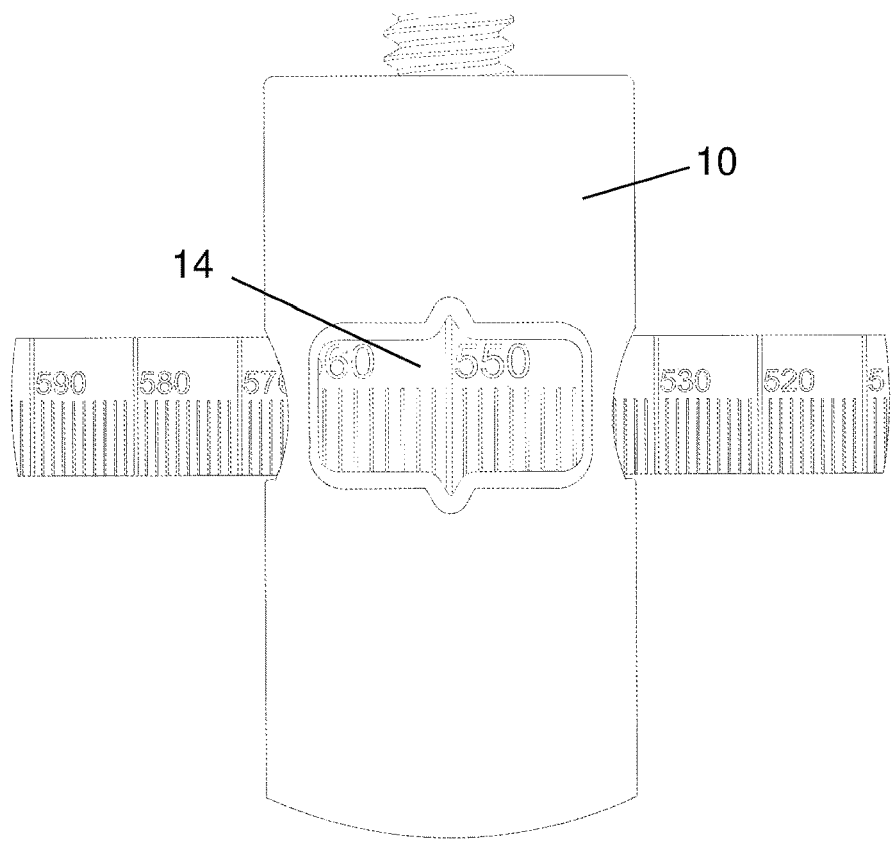
FIG. 3 illustrates a close up view of a central body portion of an example configuration of a sliding adjustable compass according to the present disclosure.

Referring to FIG. 3, a close up view of the central body 10 and the viewing lens 14 is shown. As can be seen, the markings along the measuring element that are viewable through the lens are magnified in comparison to the markings which are not viewed through the lens. The present example shows a distance of 550 mm or 55 cm from the support. While metric measurements are shown in the present example it will be understood that alternative measurement markings can be used. For example, the measuring element may shown centimetres along one side and inches along the opposing side.

Figure 4:
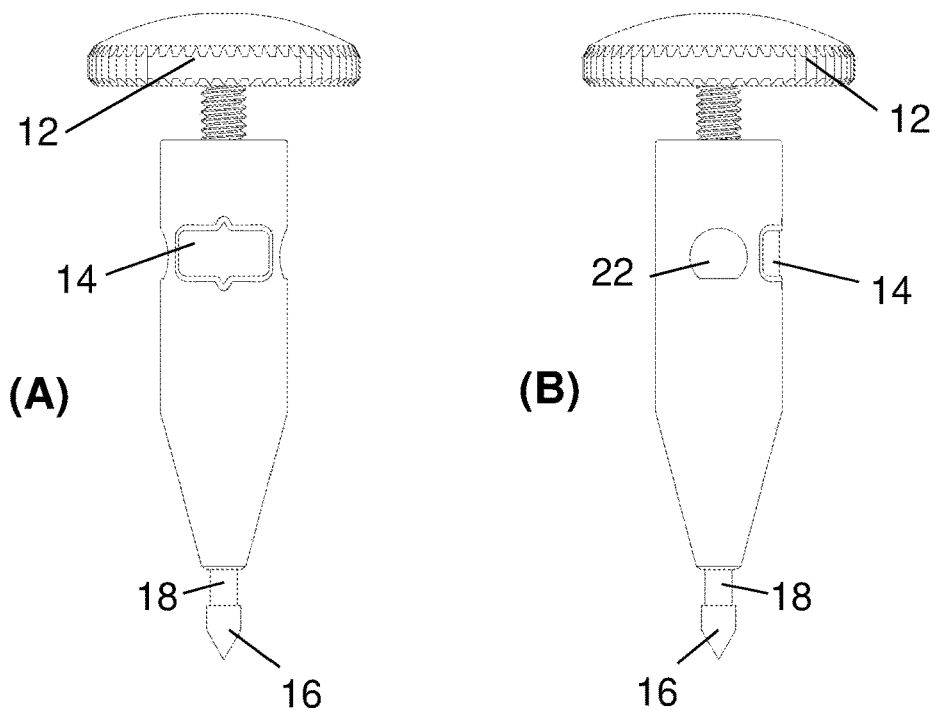
FIG. 4 illustrates two different side views of the central body portion of to illustrate an example configuration of both the viewing lens and the sliding aperture.
Figure 5:
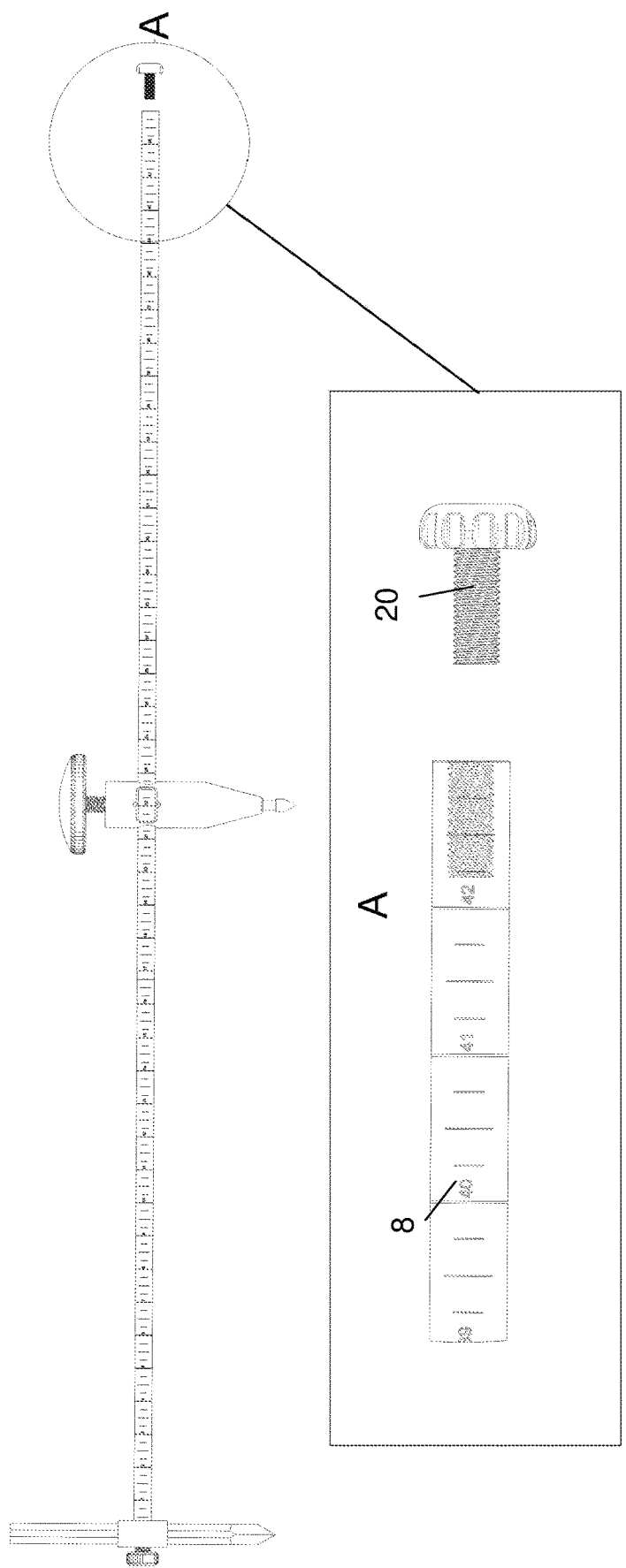
FIG. 5 illustrates an example configuration of an assembled sliding adjustable compass according to the present disclosure viewed from the side with a marking implement held in the support, and with a close up of the opposing end of the elongated measuring element.

Referring to FIG. 4 illustrates two different side views of the central body portion 10 are shown. In view (A) a front of the viewing lens is shown and in view (B) the aforementioned aperture 22 is shown, through which the measuring element is threaded to assemble the compass 2. As can be seen from both views, the aperture 22 extends the whole way through the central body 10. Referring to FIG. 5, the view of FIG. 1 is shown with a close up view of the screw attachment 20 for putting a slide "stop" on the opposing end of the measuring element. While a screw attachment is used in the present example a person skilled in the art will recognise that various other mechanisms could be used to prevent the central body 10 from sliding off could be used.

While the compass 2 of the present disclosure is capable of firmly holding and using a wide variety of cutting and marking implements, since the support comprises an adjustable aperture for receiving said implements, it may in some cases where very precise marks and cuts needs to be made, be convenient to have a cutting or marking implement designed for use with the compass of the present disclosure.

Therefore a number of example designs for possible cutting and marking implements for use with the compass of the present disclosure are also provided herein. A benefit of using such accessories in place of other cutting and marking implements is that the portions of the specially designed implements that will be held by the support 4 can be formed so as to ensure that the tip of the cutting or marking implement is held directly underneath the support and precisely perpendicular to the measuring element 8. Thus error in the indicated measurement can be reduced.

Figure 6:
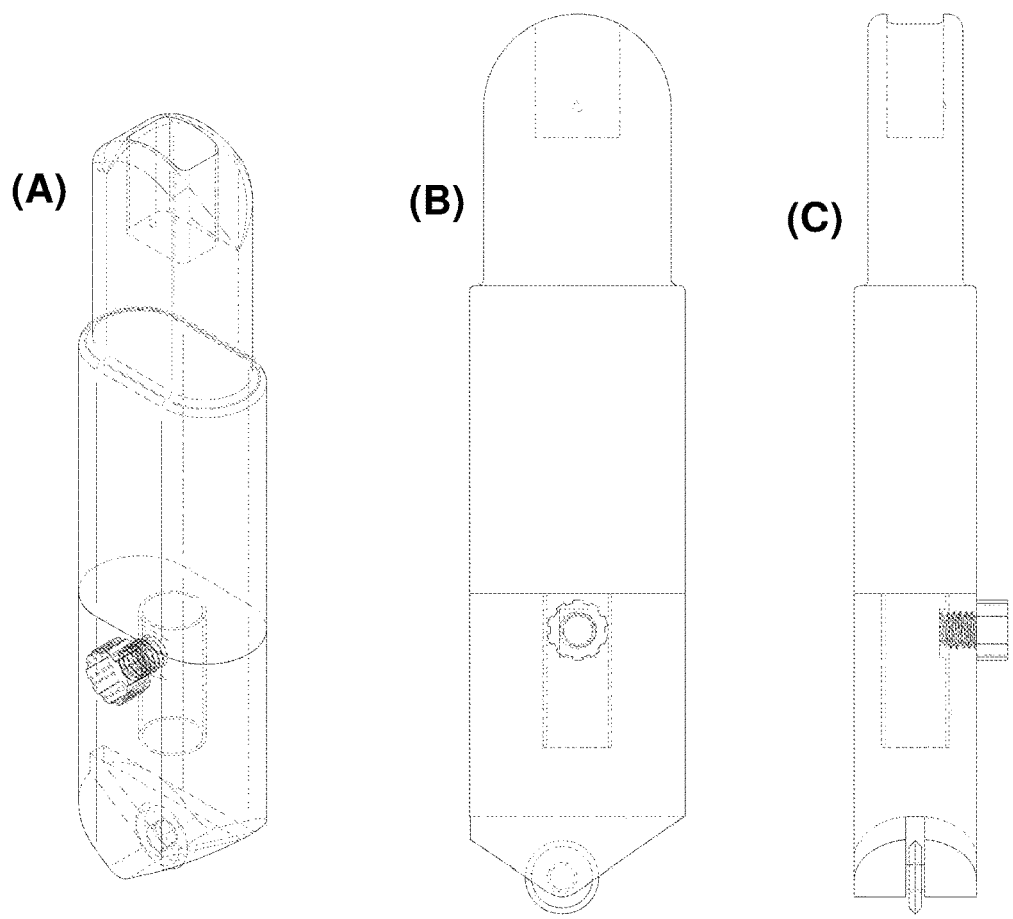
FIG. 6 illustrates an example of a marking implement that could be provided in accordance with the present disclosure to be held in the support, a transparent view (A) a side view (B) and a front view (C) of the implement are shown.
Figure 7:
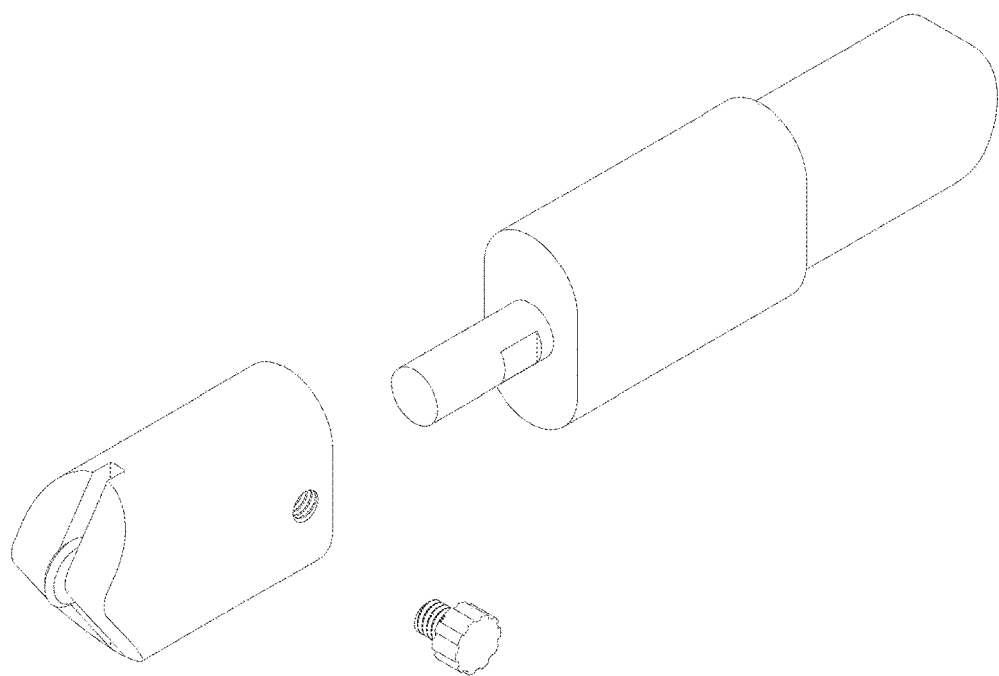
FIG. 7 illustrates an exploded components view of the marking implement of FIG. 6.

FIG. 6 illustrates an example of a marking implement that could be provided in accordance with the present disclosure to be held in the support, a transparent view (A) a side view (B) and a front view (C) of the implement are shown. FIG. 7 illustrates an exploded components view of the marking implement of FIG. 6.

Figure 8:
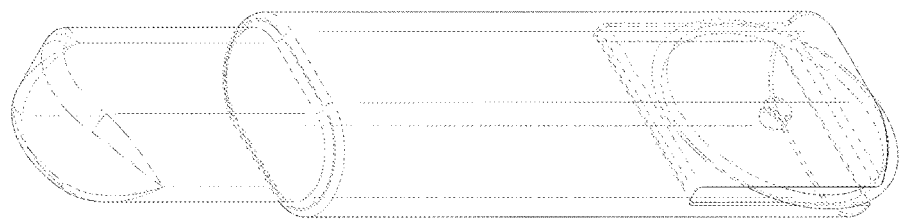
FIG. 8 illustrates an example of a cutting implement that could be provided in accordance with the present disclosure to be held in the support, a front view (A) a side view (B) and a transparent view (C) of the implement are shown.
Figure 8:
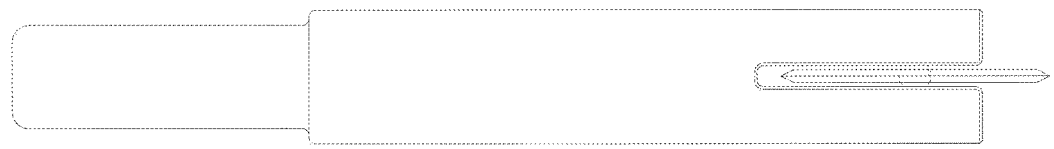
Figure 8:

FIG. 8 illustrates an example of a cutting implement that could be provided in accordance with the present disclosure to be held in the support, a front view (A) a side view (B) and a transparent view (C) of the implement are shown.

Figure 9:
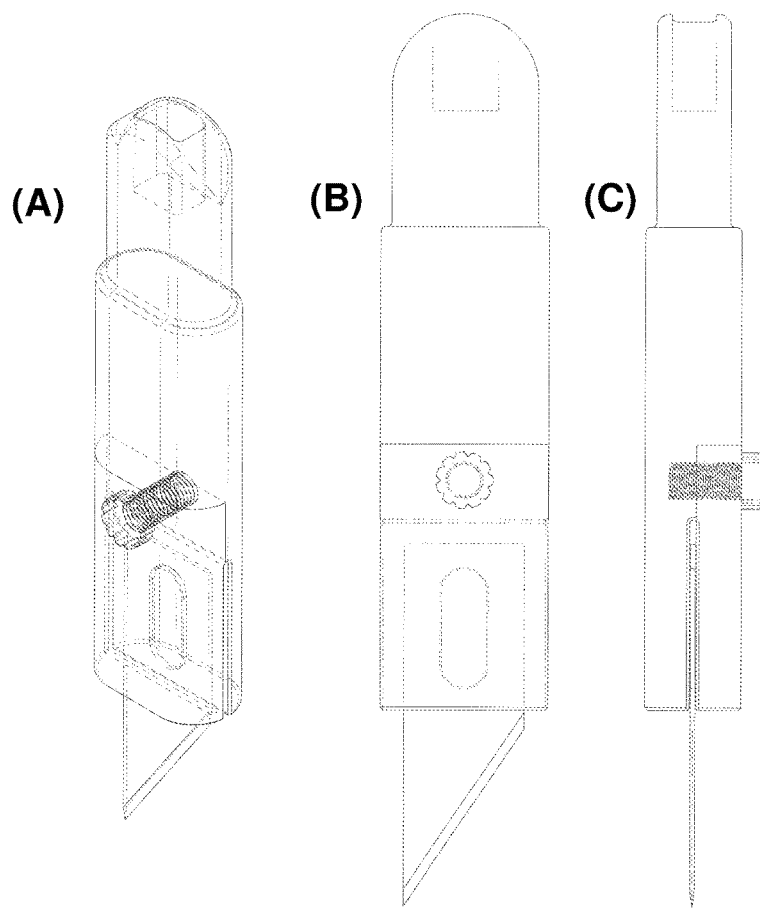
FIG. 9 illustrates an example of another cutting implement that could be provided in accordance with the present disclosure to be held in the support, a transparent view (A) a side view (B) and a front view (C) of the implement are shown.
Figure 10:
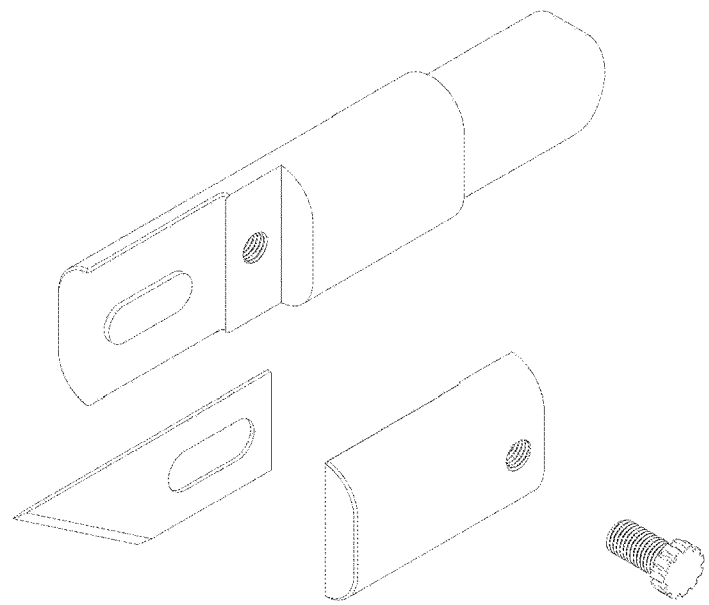
FIG. 10 illustrates an exploded components view of the cutting implement of FIG. 9.

FIG. 9 illustrates an example of another cutting implement that could be provided in accordance with the present disclosure to be held in the support, a transparent view (A) a side view (B) and a front view (C) of the implement are shown. FIG. 10 illustrates an exploded components view of the cutting implement of FIG. 9.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

For example, the terms "screw element 6", "tightening knob 12" and "screw attachment 20" have all been provided with distinct labels for clarity, to indicate that they are separate elements on different locations of the compass, however they all share similar functionality, and so their functions could technically all be achieved the same type of component.

The disclosed embodiments are illustrative, not restrictive. While specific configurations of the adjustable compass have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An adjustable compass, comprising:
   a support having an aperture configured to receive and hold a marking or cutting implement;
   an elongate measuring element having a first end connected to the support, a length, and at least one set of markings along the length, each marking being indicative of a distance along the length from the support; and
   a central body having a tip element, an aperture configured to slidably receive the measuring element, and a viewing lens aligned with the aperture such that a marking of the measuring element is viewable through the lens when the measuring element is in place in the aperture, the marking thus indicating a distance between the central body and the support;
   wherein the tip element comprises an indented portion, and the adjustable compass further comprises a detachable suction cup element configured to be affixed to the indented portion of the tip element.

2. An adjustable compass according to claim 1, wherein the viewing lens comprises a magnifying lens to increase the size of the visible marking when viewed through the lens.

3. An adjustable compass according to claim 1, wherein measuring element is in the form of an elongated cylinder having a flat indent along its circumference to prevent rotation within the aperture.

4. An adjustable compass according to claim 1, wherein the measuring element has two parallel sets of measurement markings on opposing sides of its length.

5. An adjustable compass according to claim 4, wherein a first set of markings is in centimetres and a second set of markings is in inches.

6. An adjustable compass according to claim 1, wherein the central body further comprises a tightening element for affixing the measuring element in place within the central body at a desired distance.

7. An adjustable compass according to claim 1, wherein the compass further includes one or more marking or cutting implements shaped to be received by the support.

8. An adjustable compass according to claim 1, wherein the support further comprises a tightening element for receiving cutting or marking implements of different sizes.

* * * * *